United States Patent

Nakamura

[11] Patent Number: 5,835,370
[45] Date of Patent: Nov. 10, 1998

[54] NETWORK HAVING A CONTROL DEVICE AND A PLURALITY OF SLAVE DEVICES AND COMMUNICATION METHOD USING THE SAME NETWORK

[75] Inventor: Akira Nakamura, Kanaga-ken, Japan

[73] Assignee: Victor Company of Japan, Ltd., Yokohama, Japan

[21] Appl. No.: 755,694

[22] Filed: Nov. 25, 1996

[30] Foreign Application Priority Data

Dec. 26, 1995 [JP] Japan .................................... 7-351893

[51] Int. Cl.$^6$ .................................................... G06F 19/00
[52] U.S. Cl. ................ 364/132; 395/200.38; 395/200.62
[58] Field of Search .................................. 364/131–138; 395/200.38–200.41, 200.68–200.74, 200.81, 200.75, 200.83, 200.6, 200.62, 200.63, 200.67, 290; 340/825.06, 825.07, 825.08; 370/449–457

[56] References Cited

U.S. PATENT DOCUMENTS 4,149,238  4/1979  James et al. ............................. 395/290
4,752,868  6/1988  Nicholas et al. ........................ 364/132
4,888,728  12/1989  Shirakawa et al. ................ 395/200.38

FOREIGN PATENT DOCUMENTS 63-272240  11/1988  Japan .

*Primary Examiner*—Joseph Ruggiero
*Attorney, Agent, or Firm*—Michael N. Meller

[57] ABSTRACT

A control device and a plurality of slave devices are connected to a common transmission channel. The control device sets an assigned communication mode by sending a receiving inhibit command to all of the slave devices except one assigned and executes an assigned communication with the assigned slave device based on a unique communication protocol free from restrictions in relation to the remaining slave devices. In this case, the control device and the assigned slave device communicate with each other under a condition that maximum rest time period of communication data is within a constant time. The cancelling of the assigned communication mode and the receiving inhibit mode and the returning to the usual communication mode are automatically executed according to a time management using timers contained in the control device and the remaining slave devices.

15 Claims, 5 Drawing Sheets

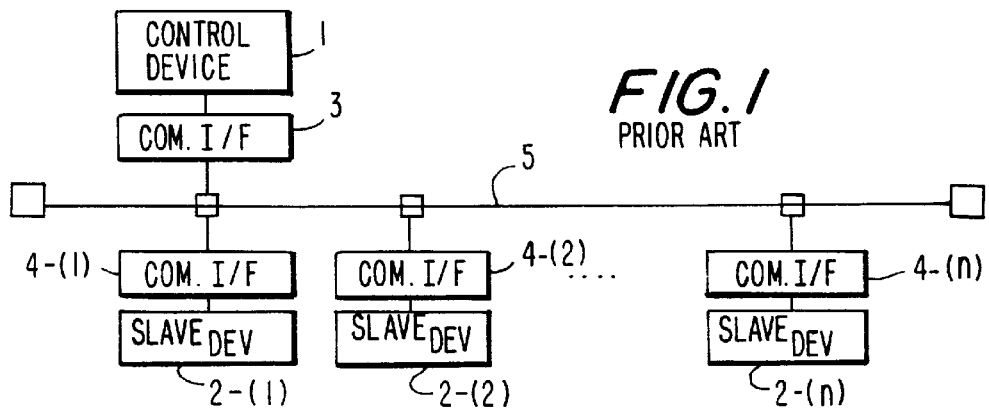
FIG. 1
PRIOR ART
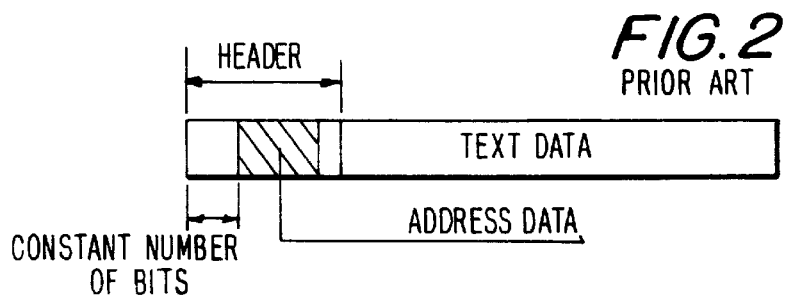
FIG. 2
PRIOR ART
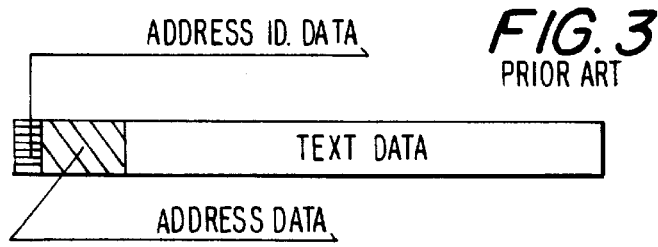
FIG. 3
PRIOR ART
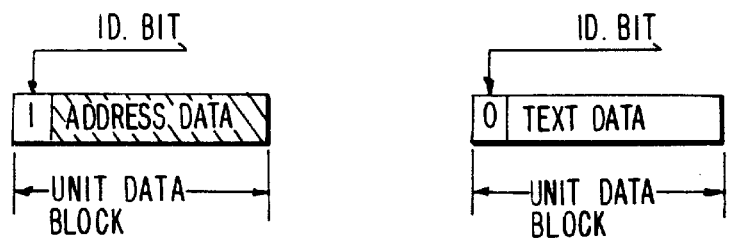
FIG. 4A
PRIOR ART
FIG. 4B
PRIOR ART

NETWORK HAVING A CONTROL DEVICE AND A PLURALITY OF SLAVE DEVICES AND COMMUNICATION METHOD USING THE SAME NETWORK

BACKGROUND OF THE INVENTION

1. Field of the Invention

The present invention relates to a network having a control device (host computer) and a plurality of slave devices (terminal devices) and a communication method using the same network. Particularly, the present invention relates to a network and a communication method using the same network, which are suitable to be applied to a LAN (Local Area Network) having a net topology of bus type or ring type, etc., and to execute individual communications according to a non-limited, arbitrary communication protocol by assigning one of slave devices on demand by a control device connected to a transmission channel common for the slave devices.

2. Description of the Prior Art

In order to improve efficiency of office work and productivity in factories, various LAN's have been proposed as communication means connecting a host computer to terminal devices within a local area. With using such LAN, a communication between the host computer which is a control device and the terminal devices which are slave devices is possible at a transmission rate as high as several hundreds k bits/sec to 100M bits/sec.

In general, in a LAN, a net topology of star type, bus type or ring type is employed. When a control device and a plurality of slave devices are connected to a LAN of star type, the control device must handle a number of channels. On the other hand, in a LAN of bus or ring type, a control device and slave devices can be connected to a common transmission line (bus) through respective simple and inexpensive communication interfaces (I/F's). Therefore, it is usual to employ a LAN of bus or ring type.

FIG. 1 shows a general construction of an example of the LAN of bus type, in which a control device (host computer) 1 and a plurality of slave devices (terminal devices) 2-(1), 2-(2), . . . , 2-(n) are connected to a bus 5 through respective communication interfaces I/F 3, I/F 4-(1), I/F 4-(2), . . . , I/F 4-(n). In a case where the control device 1 and the slave devices 2-(1), 2-(2), . . . , 2-(n) communicate with each other, the control device 1 and/or the slave devices 2-(1), 2-(2), . . . , 2-(n) send messages together with address data of destination devices to the bus 5 and the destination device or devices receive only messages containing their respective address data.

Therefore, in order to reliably identify the address data in the messages sent from the control device 1 and/or the slave devices 2-(1), 2-(2), . . . , 2-(n) without being mixed with other text data, etc., the address data must be formatted suitably.

In order to suitably format the address data, the following methods have been proposed:

(a) an address data is positioned a certain fixed position in a message as shown in FIG. 2 and the address data is detected by counting bits from a head bit of the message;

(b) an address identification data having a specific format is position in a message immediately preceding an address data as shown in FIG. 3 and the address data is detected by detecting the identification data;

(c) a head bit of each constant unit data block of, for example, 8 bits set as a processing unit in the usual data communication is used as an identification bit as shown in FIGS. 4A and 4B, with which it is determined whether the data block is related to an address data or a text data.

When the method (a) is employed, there may be a case where, when messages are transmitted successively, successive bit trains become coincident with address data of respective devices. Therefore, a constant time interval Trest must be provided every transmission of message data as shown in FIG. 5. Incidentally, a capital letter D in FIG. 5 denotes the message data.

Therefore, in this case, the communication efficiency is substantially lowered due to the existence of time period Trest between adjacent messages, in which there is no data.

In the method (b) mentioned above, the data format is restricted since a data having a train of bits which is identical to a bit train of the address identification data may be used in a text data, etc.

According to the method (c), the redundancy of a whole communication data becomes large since the identification bit is always attached to each data block, resulting in degradation of communication efficiency as in the case of the method (a).

On the other hand, in a small size network such as a LAN in which a control device and a plurality of slave devices, the control device totally or separately controls the respective slave devices and there may be cases where the control device communicates concentrically with a specific one of the slave devices by assigning the one slave device as a destination device. In such case, a ratio of time necessary to perform such concentric communication with specific slave devices to a total communication time may become considerable depending upon nature of the LAN and/or the kind of slave devices.

In such case, since the communication is between the control device and assigned one of the slave devices during execution of the concentric communication, it is possible to specify the destination without attaching any address data of the destination device. However, according to any of the above mentioned methods (a), (b) and (c) in which an address data is always inserted into a message data, the communication efficiency thereof becomes substantially the same as that of the usual communication mode and is to be improved.

Further, since it is to be avoided, in setting a communication protocol, that a bit train of a text data of a message becomes coincident with that of an address data, the preparation of data format by taking the above restriction into consideration becomes very difficult.

SUMMARY OF THE INVENTION

An object of the present invention is to provide a network in which a communication between a control device and one of a plurality of slave devices which is assigned by setting an assigned communication mode can be executed according to an arbitrary protocol which is free from restriction of communication procedure and/or data format, and a communication method using the same network.

Another object of the present invention is to improve the communication efficiency and to facilitate production of data format.

A further object of the present invention is to shorten a time necessary to shift the operation mode from a usual communication mode to an assigned communication mode.

A still further object of the present invention is to improve the reliability of a whole system.

In order to achieve the above objects, the present invention provides a network comprising a common transmission channel of bus or ring type, a control device connected to the common transmission channel and comprising time measuring means and a plurality of slave devices, each of the slave devices comprising signal detection means for detecting whether or not there is a data signal on the common transmission channel and a time measuring means adapted to be reset upon a detection of the data signal by the signal detection means.

Further, the present invention provides a network and a communication method in which the control device executes a communication in a usual communication mode in which it communicates with the respective slave devices totally or individually and sends a receiving inhibit command to slave devices other than that which is assigned to individually communicate with the control device to shift the usual communication mode to an assigned communication mode in which only communication between the control device and the assigned slave device is possible.

Further, the present invention provides a network and a communication method in which the slave devices other than the assigned slave device actuate their time measuring means after they receive the receiving inhibit command and the control device and the assigned slave device execute a communication on the basis of an individual communication protocol when maximum communication rest time periods of the control device and the assigned slave device are shorter than a constant time after the communication mode is shifted to the assigned communication mode.

Further, the present invention provides a network and a communication method in which the control device sends an assigned communication cancelling command to the assigned slave device to return the assigned slave to the usual communication mode and actuates the time measuring means thereof after the assigned slave device is returned to the usual communication mode and the control device and the slave devices other than the assigned slave device are returned to the usual communication mode at a time when the time measuring means of them measure a predetermined time exceeding the maximum communication rest time.

Further, the present invention provides a network and a communication method in which, in shifting the operation mode from the usual communication mode to the assigned communication mode, the control device sends preliminarily a command for invalidating the receiving inhibit command to the assigned slave device and then a receiving inhibit command to all of the slave devices in a multiple address system and, after the receiving inhibit command is sent to all of the slave devices in the multiple address system, a response request command to the slave devices other than the assigned slave device and executes a communication in the assigned communication mode when it confirm that there is no response from the slave devices other than the assigned slave device.

BRIEF DESCRIPTION OF THE DRAWINGS

FIG. 1 shows a general construction of a LAN of bus type;

FIG. 2 shows an arrangement of an address data in a message;

FIG. 3 shows another arrangement of an address data in a message;

FIGS. 4A and 4B show a method of discriminating an address data from a text data in data block unit;

DETAILED DESCRIPTION

Embodiments of a network of the present invention and embodiments of a communication method of the present invention, using the same network will be described in detail with reference to FIGS. 6 to 9.

Figure 8:
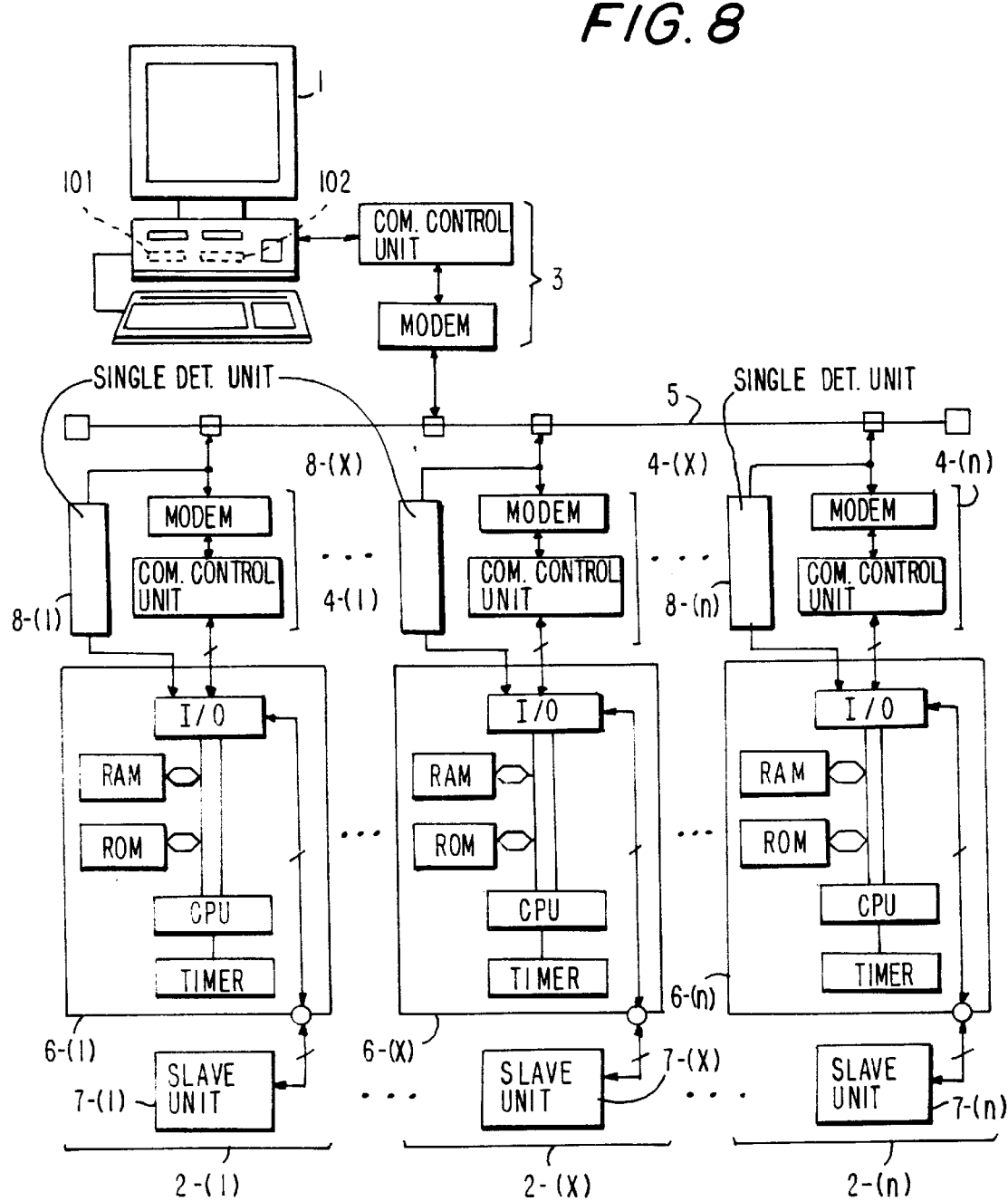
FIG. 8 shows a Factory Automation (FA) construction of a LAN of bus type according to a network of the present invention.

First, FIG. 8 shows a construction of a network of the present invention schematically. In FIG. 8, an FA (Factory Automation) system of a LAN of bus type is constructed with a common transmission channel 5 to which a control device (personal computer, host computer) 1 and a plurality (n) of slave devices (terminal devices) 2-(1), 2-(2), . . . , 2-(n) are connected through respective communication interfaces I/F 3, I/F 4-(1), I/F 4-(2), . . . , I/F 4-(n). Although the basic construction of the FA system is similar to that shown in FIG. 1, the system shown in FIG. 8 includes features of the present invention as will be described later.

Incidentally, a reference numeral 2-(x) in FIG. 8 denotes an arbitrary one of the slave devices 2-(1), 2-(2), . . . , 2-(n), which is, in this embodiment, called as an assigned slave device requiring an individual communication. Although the assigned slave device may be the slave device 2-(1) or 2-(n), the assigned slave device 2-(x) is one of the slave devices except the slave devices 2-(1) and 2-(n).

In the construction shown in FIG. 8, the control device 1 and the respective slave devices 2-(1), . . . , 2-(n) send/receive messages including command data and control state data through the common transmission channel 5 and micro computer circuits 6-(1), 6-(2), . . . , 6-(n) of the respective slave devices 2-(1), 2-(2), . . , 2-(n) control respective slave units 7-(1), 7-(2), . . . , 7(n). The communication interfaces I/F 3, I/F 4-(1), I/F 4-(2), . . , I/F 4-(n) are constituted with modem's and communication control units, respectively, since this LAN is an analog channel. When the LAN is a digital channel, digital service units (DSU's) may be used instead of the respective combinations of modem's and communication control units.

Features of the LAN of bus type are that the slave devices 2-(1), 2-(2), . . . , 2-(n) include respective signal detectors 8-(1), 8-(2), . . , 8-(n) connected directly to the common transmission channel 5 so that the micro computers 6-(1), 6-(2), . . , 6-(n) can confirm, through the signal detectors 8-(1), . . . , 8-(n), whether or not any data exists on the common transmission channel 5 and that the control device 1 includes a ROM 101 storing a program for executing the communication protocol in either the usual communication mode or the assigned communication mode and a timer 102 and the micro computer circuits 6-(1), . . , 6-(n) of the slave devices 2-(1), . . , 2-(n) include ROM's each storing the same program as that stored in the ROM 101 and timers, respectively.

Figure 6:
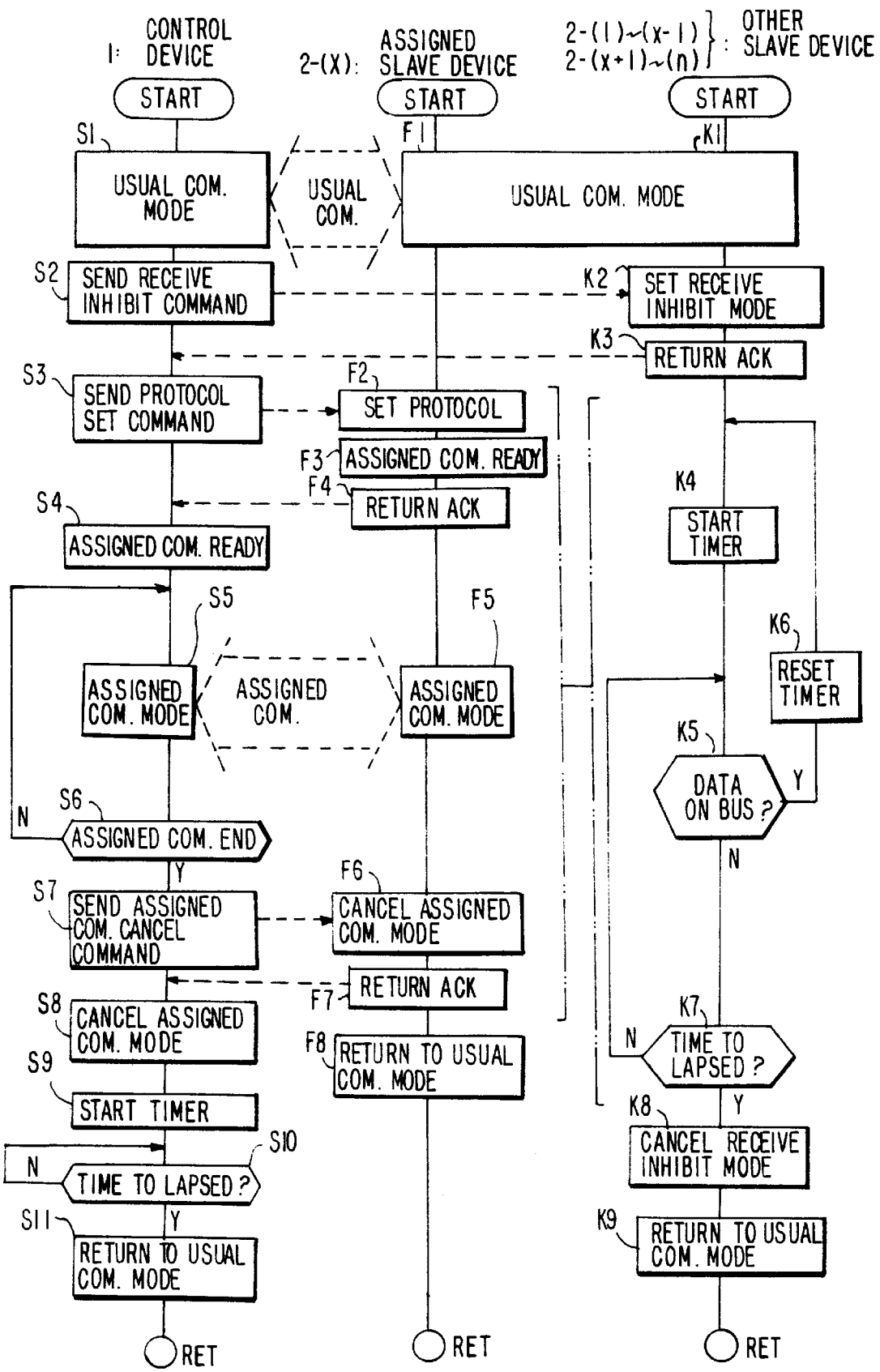
FIG. 6 is a communication sequence flow showing a communication procedure between a control device and slave devices according to an embodiment of a communication method using a network of the present invention.

A communication procedure between the control device 1 and the slave devices 2-(1), . . , 2-(n) in the LAN of bus type will be described with reference to a communication sequence flow shown in FIG. 6.

It is assumed first that the control device 1 and the slave devices 2-(1), . . . , 2-(n) are executing a communication in the usual communication mode (S1/F1/K1). In the usual communication mode, a communication is performed between the control device 1 and all of the slave devices 2-(1), . . . , 2-(n) by transmitting control data from the control device 1 to all of the slave devices 2-(1) . . , 2-(n) totally or between the control device 1 and a selected one of the slave devices by assigning an address of the selected slave device, on the basis of one and same communication protocol.

When it becomes necessary that, in the usual communication mode, the control device 1 communicates concentrically with only a specific slave device 2-(x), the control device 1 sends a receiving inhibit command to other slave devices 2-(1), . . . , 2-(x−1), 2-(x+1), . . . , 2-(n) than the specific slave device 2-(x).

On the other hand, the slave devices 2-(1), . . . , 2-(x−1), 2-(x+1 ), . . . , 2-(n) which receive the receiving inhibit command set themselves in a receiving inhibit mode immediately and send ACK (Acknowledge Character) back to the control device 1 (K3). The control device 1 confirms by ACK that the shift of the communication mode of the slave devices 2-(1), . . . , 2-(x−1), 2-(x+1), . . . , 2-(n) to the assigned communication mode is completed.

As a result, the micro computer circuits 6-(1), . . . , 6-(x−1), 6-(x+1), . . . , 6-(n) of the slave devices 2-(1), . . . , 2-(x−1), 2-(x+1), . . . , 2-(n) ignore any data appeared on the common transmission channel 5 so that, even if there is a data whose bit train is coincident with that of an address of any of the slave devices 2-(1), . . . , 2(x−1), 2-(x+1), . . . , 2-(n), it does not accept the data.

In this case, however, the signal detectors 8-(1), . . . , 8-(x−1), 8-(x+1), . . . , 8-(n) of the slave devices 2-(1), . . . , 2-(x−1), 2-(x+1), . . . , 2-(n) operating in the receiving inhibit mode continue to detect data signal or signals on the common transmission channel. The micro computer circuits 6-(1), . . . , 6-(x−1), 6-(x+1), . . . , 6-(n) of the slave devices 2-(1), . . . , 2-(x−1), 2-(x+1), . . . , 2-(n) start their own timers after they send ACK back to the control device 1 and reset them if any of the signal detectors 8-(1), . . . , 8-(x−1), 8-(x+1), . . . , 8-(n) detects data signal (K4 to K7).

After the above mentioned procedure is completed, the control device 1 sends a protocol setting command (S3). When the protocol setting command is received by the assigned slave device 2-(x), the latter device set itself in an assigned communication ready state and sends ACK back to the control device 1 (F2 to F4). Upon a receipt of ACK from the assigned slave device 2-(x), the control device 1 sets itself in the assigned communication ready state (S4).

As a result, the control device 1 and the assigned slave device 2-(x) become a state where they can communicate with each other in the assigned communication mode to exchange data concentrically therebetween (S5/F5).

Since, in this case, the slave devices 2-(1), . . . , 2-(x−1), 2-(x+1), . . . , 2-(n) are in the receiving inhibit mode, the control device 1 and the slave device 2-(x) can execute a communication directly according to a different communication protocol from the usual communication mode.

Therefore, there is no need of attaching address data to messages transmitted by them. That is, in the assigned communication mode, it is possible to set an arbitrary data format and communication sequence which are free from any restriction related to the other slave devices 2-(1), . . . , 2-(x−1), 2-(x+1), . . . , 2-(n) and to employ a unique communication protocol with which the most efficient communication is possible between the control device 1 and the assigned slave device 2-(x).

Figure 5:
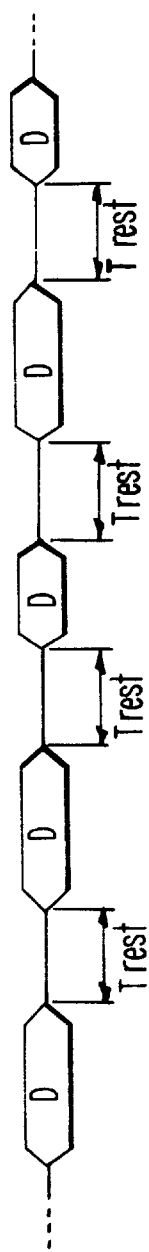
FIG. 5 shows a condition for sending a message to a common transmission channel.
Figure 7:
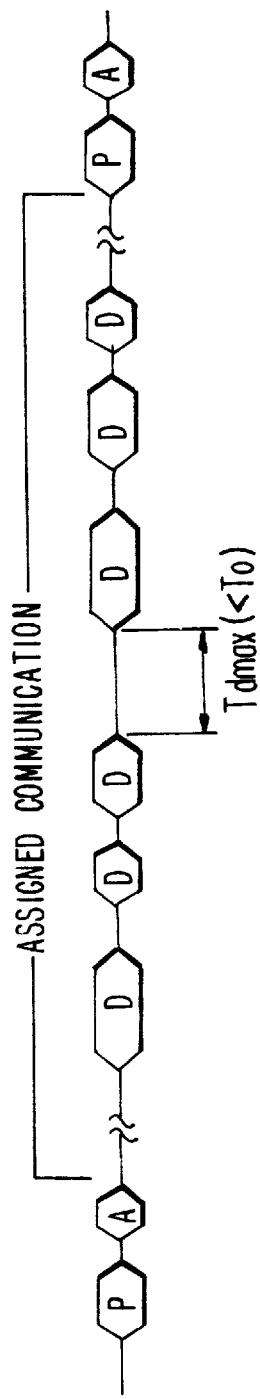
FIG. 7 illustrates an existence of data on a common transmission channel according to an assigned communication mode of the present invention.

Only one condition given to the assigned communication mode is that maximum rest period Tdmax of communication data transmitted between the control device 1 and the assigned slave device 2-(x) has not to exceed a constant time To, as shown in FIG. 7.

The constant time To is set as a limit time beyond which the micro computer circuits 6-(1) to 6-(n) do not reset their timers. Since, as mentioned above, the micro computer circuits 6-(1), . . . , 6-(x−1), 6-(x+1), . . . , 6-(n) of the slave devices 2-(1), . . . , 2-(x−1), 2-(x+1), . . . , 2-(n) reset their timers every time when the signal detectors 8-(1), . . . , 8-(x−1), 8-(x+1), . . . , (8-n) detect data signals in the receiving inhibit mode (K4 to K7), it does not occur a situation where the timers on the side of the slave devices 2-(1), . . . , 2-(x−1), 2-(x+1), . . . , 2-(n) time out during the assigned communication under the condition Tdmax<To. The respective timers repeat the resetting operation every time the signal detectors 8-(1), . . . , 8-(x−1), 8-(x+1), . . . , 8-(n) detect data signals.

When the assigned slave device 2-(x) requests the control device 1 to supply complicated control data or to mathematically operate data in data processing, there may be a case where a mathematical operation time on the side of the control device 1 exceeds To. In such case, it is possible to satisfy the above mentioned condition in the assigned communication mode by outputting a dummy data from the control device 1 or the assigned slave device 2-(x) to the common transmission channel 5 such that a rest period of the communication data does not exceeds To.

Then, when the concentric exchange of data between the control device 1 and the assigned slave device 2-(x) is no longer necessary and the assigned communication mode is to be ended, the control device 1 sends an assigned communication cancelling command to the assigned slave device 2-(x) (S6, S7). Upon the assigned communication cancelling command, the assigned slave device 2-(x) cancels its own assigned communication mode and sends ACK back to the control device 1, returning to the usual communication mode (F6 to F8).

Upon a receipt of the ACK from the slave device 2-(x), the control device 1 cancels its own assigned communication mode and simultaneously starts its timer 102 to return to the usual communication mode after the time To lapses (S8 to S11).

Therefore, the control device 1 does not send any data for at least the time To after its assigned communication mode is cancelled.

On the other hand, the other slave devices 2-(1), . . . , 2-(x−1), 2-(x+1), . . . , 2-(n) reset their timers at the time when the assigned slave device 2-(x) sends the ACK in the step F7. Since the assigned communication mode is cancelled after the ACK, there is no data signal appears on the common transmission channel 5 and the timers count the time To.

Therefore, the other slave devices 2-(1), . . . , 2-(x−1), 2-(x+1), . . . , 2-(n) cancel their receiving inhibit mode automatically by the counted time To, respectively, and return to the usual communication mode (K7 to K9).

Since the other slave devices 2-(1), . . . , 2-(x−1), 2-(x+1), . . . , 2-(n) return to the usual communication mode according to only time management's by means of their own timers as mentioned, there is no need of preparing any special cancelling command which becomes also effective in the receiving inhibit mode and a narrowing of a selection range of data format in the assigned communication mode can be avoided.

Since, in this embodiment, the control device 1 sends the receiving inhibit command to the respective slave devices 2-(1), . . . , 2-(x−1), 2-(x+1), . . . , 2-(n) when the mode is switched from the usual communication mode to the assigned communication mode and sets the assigned communication mode in response to ACK's from the respective slave devices 2-(1), . . . , 2-(x−1), 2-(x+1), . . . , 2-(n), the mode shifting process takes a considerable time.

Figure 9:
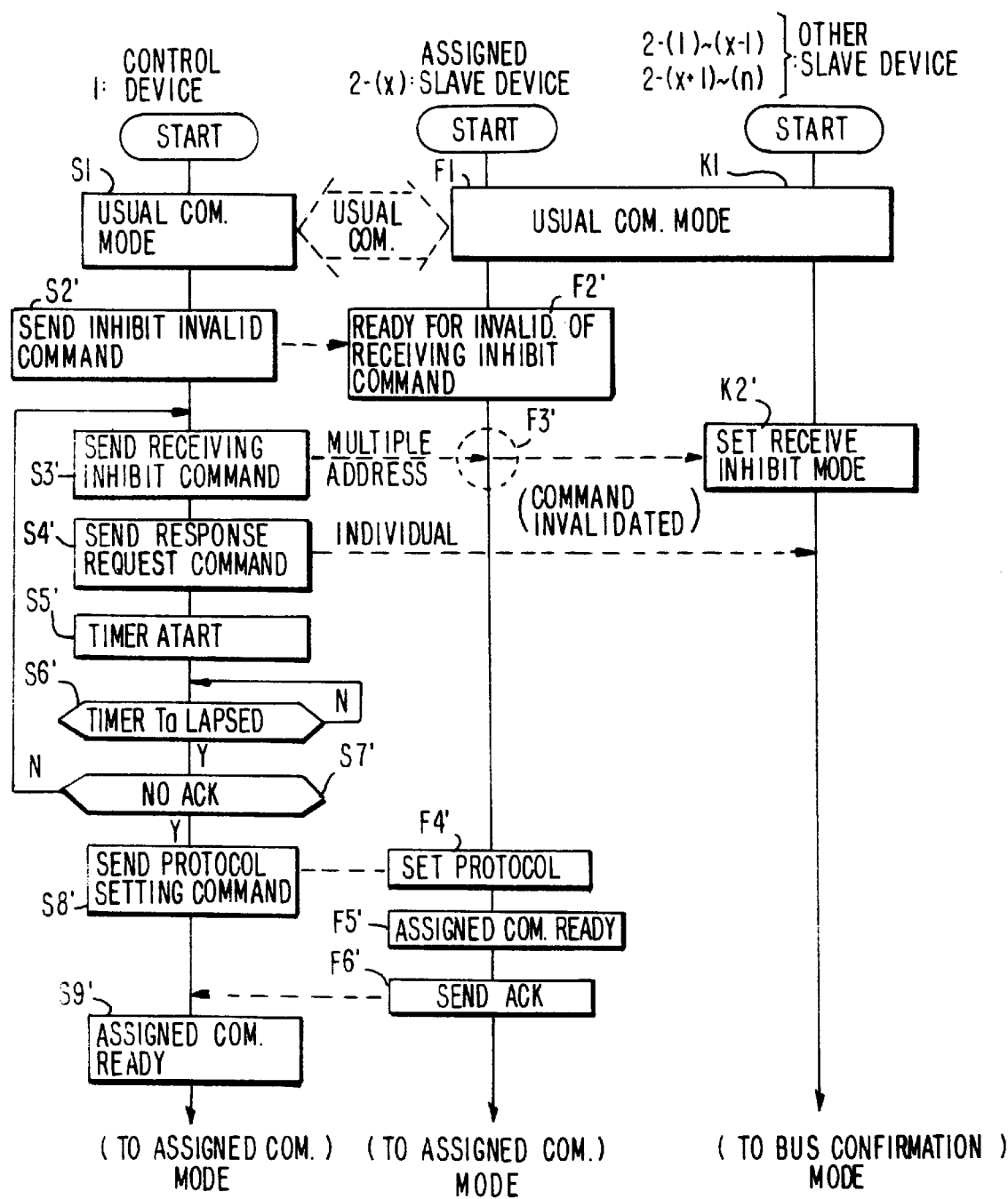
FIG. 9 is a communication sequence flow showing another embodiment of the present invention when a communication mode is switched from a usual communication mode to an assigned communication mode.

This problem can be solved by employing a communication procedure such as shown in FIG. 9 in the mode shifting process.

In this communication procedure, the control device 1 preliminarily sends a inhibit invalidating command for invalidating a subsequent receiving inhibit command to the assigned slave device 2-(x) in the usual communication mode to make the assigned slave device 2-(x) ready for invalidation (S2'/F2')

Then, the control device 1 sends the receiving inhibit command to all of the slave devices 2-(1) to 2-(n) by the multiple address system. Since, in this case, the assigned slave device 2-(x) is ready for invalidation by the inhibit invalidating command preliminarily supplied by the control device 1, the assigned slave device 2-(x) invalidates the receiving inhibit command and maintains a receivable state (S3'/F3'). However, since the other slave devices 2-(1), . . . ,2-(x−1), 2-(x+1), . . . , 2-(n) are not given the inhibit invalidating command, they set the receiving inhibit mode (S3'/K2').

Further, the control device 1 sends a response request command to the respective slave devices 2-(1), . . . ,2-(x−1), 2-(x+1), . . . , 2-(n) and starts its own timer 102 (S4', S5').

In this case, the slave devices 2-(1), . . . ,2-(x−1), 2-(x+1), . . . , 2-(n) do not accept the response request command if they are in the receiving inhibit mode by the receiving inhibit command, and so they can not respond.

Therefore, the control device 1 measures a constant time Ta which is maximum time required to respond in the usual communication by the timer 102 and, when any response is not received from the slave devices 2-(1), . . . ,2-(x−1), 2-(x+1), . . . , 2-(n) within the time Ta, it can be confirmed that the slave devices 2-(1), . . . ,2-(x−1), 2-(x+1), . . . , 2-(n) are in the receiving inhibit mode (S5' to S7').

If there is a response from any slave device, it means that the latter slave device is not in the receiving inhibit mode. Therefore, the control device 1 sends again the receiving inhibit command and the response request command to the individual slave devices to re-confirm whether or not there is any response (S7', S3' to S6').

As a result, it becomes possible to shift the control device 1 and the assigned slave device 2-(x) to the assigned communication mode after the control device 1 confirms that the slave devices 2-(1), . . . ,2-(x−1), 2-(x+1), . . . , 2-(n) are in the receiving inhibit mode, and thus it is possible to prevent an erroneous operation due to incomplete shift to the assigned communication mode.

As described in detail hereinbefore, since the network of the present invention includes the control device having the timer and the slave devices each having a signal detector for detecting whether or not there is a data signal on the common transmission channel and a timer adapted to be reset upon a detection of the data signal by the signal detector, it is specifically suitable for execution of individual communication according to an arbitrary communication protocol free from restriction by assigning one of the slave devices.

Since, in the network and communication method of the present invention, the control device executes a communication in the usual communication mode in which it communicates with the respective slave devices totally or individually and shifts the communication mode to the assigned communication mode in which only the control device and the assigned slave device can communicate with each other by sending the receiving inhibit command to slave devices other than the assigned slave device, it becomes possible to execute a concentric communication between the control device and the assigned slave device by using an arbitrary communication protocol which is free from the restriction in communication procedure and/or data format caused by the other slave devices, resulting in an improvement of communication efficiency.

Further, since, in the assigned communication mode, the slave devices other than the assigned slave device are in the receiving inhibit state, it is possible to prevent erroneous operation of the other slave devices even when an error occurs in a transmission data, resulting in an improvement of the reliability of the whole system.

Further, in the present invention, the slave devices other than the assigned slave device actuate their timers after they receive the receiving inhibit command and the control device and the assigned slave device execute a communication on the basis of an individual communication protocol when maximum communication rest time periods of the control device and the assigned slave device are shorter than a constant time after the communication mode is shifted to the assigned communication mode.

Further, since the control device sends an assigned communication cancelling command to the assigned slave device to return the assigned slave to the usual communication mode and actuates the times thereof after the assigned slave device is returned to the usual communication mode and the control device and the slave devices other than the assigned slave device are returned to the usual communication mode at a time when the timers of them measure a predetermined time exceeding the maximum communication rest time, there is no need of any special command. Therefore, it can prevent the selection range of data format from being narrowered.

Further, in shifting the operation mode from the usual communication mode to the assigned communication mode, it is possible to shorten a time necessary to shift the usual communication mode to the assigned communication mode by sending preliminarily a command for invalidating the receiving inhibit command to the assigned slave device and then a receiving inhibit command to all of the slave devices in a multiple address system.

Further, by executing a communication in the assigned communication mode after confirming that there is no response from the slave devices other than the assigned slave device, by sending a response request command to the slave devices other than the assigned slave device after the receiving inhibit command is sent to all of the slave devices in the multiple address system, it is possible to shift the communication mode to the assigned communication mode after confirming, on the side of the control device, that the slave devices other than the assigned slave device are in the receiving inhibit state, so that the other slave devices are prevented reliably from being erroneously operated during the assigned communication and it is possible to improve the reliability of the assigned communication.

As mentioned, according to the present invention, a communication can be executed in the assigned communication mode on the basis of an arbitrary communication protocol without using address data and therefore the problems inherent to the prior arts can be solved.

Although the present invention has been described with reference to the system construction of a LAN of bus type, the present invention is also applicable to a LAN of ring type since, in the ring type LAN, a control device and a plurality of slave devices are communicated with each other through a common transmission channel.

The communication method according to the present invention can be applied to not only the network of such as LAN but also a sequential communication control between CPU's of a component type AV (Audio-Visual) system or units.

What is claimed is:

1. A network having a control device and a plurality of slave devices connected to a common transmission channel of a bus type or a ring type, wherein said control device comprises;

means for executing a communication protocol to said slave devices for communicating in a usual communication mode in which said control device communicates concurrently to all of said slave devices or for communicating in an assigned communication mode in which said control device communicates with selectively assigned slave devices;

means for sending a receiving inhibit command to certain remaining slave devices to place such slave devices in a receiving inhibit mode of operation whereby the usual communication mode is shifted to the assigned communication mode in which communication is possible only between said control device and slave devices to which an inhibit command was not sent, wherein each slave device comprises;

communication means for communicating with the common transmission bus and with said control device, detection means for detecting an inhibit command from said control device to initiate said inhibit mode of operation for such slave device and for detecting data signals on said common transmission channel;

time measuring means;

means for activating said time measuring means upon receipt of an inhibit command and means for executing a communication with said control device based on an individual communication protocol under a condition that the maximum rest time period of data from said control device and said assigned slave device is within a constant time, after the usual communication mode is shifted to the assigned communication mode.

2. A network as claimed in claim 1, wherein said control device further comprises means for returning said assigned slave device to the usual communication mode by sending an assigned communication cancelling command to said assigned slave device and means for actuating said time measuring means thereof after said assigned slave device is returned to the usual communication mode and wherein said control device and said certain slave device each includes means for returning to the usual communication mode at a time when said time measuring means measures a predetermined time exceeding the maximum rest time period.

3. A network as claimed in claim 1, wherein said control device further comprises means for preliminarily sending a command for invalidating the receiving inhibit command to said assigned slave device in shifting the usual communication mode to the assigned communication mode and means for sending the receiving inhibit command to all of the plurality of said slave devices in a multiple address system after the command for invalidating the receiving inhibit command is sent to said assigned slave device.

4. A network as claimed in claim 1, wherein said control device further comprises means for sending a response request command to said remaining slave devices after said control device sends the receiving inhibit command to all of the plurality of said slave devices in the multiple address system and executing a communication in the assigned communication mode after confirming no response from any of said remaining slave devices.

5. A communication method for use in a network having a control device and a plurality of slave devices connected to a common transmission channel of a bus type or a ring type, comprising the steps of:

executing a communication in a usual communication mode between said control device and all of said slave devices or only with selectively assigned slave devices;

shifting the usual communication mode to an assigned communication mode to perform a communication only between said control device and said selectively assigned slave devices, by sending a receiving inhibit command to the remaining unassigned slave devices measuring a time after said remaining unassigned slave devices receive the receiving inhibit command; and executing a communication between said control device and said selectively assigned slave device based on an individual communication protocol under a condition that maximum rest time period of data from each of said control device and said selectively assigned slave devices is within a constant time, after the usual communication mode is shifted to the assigned communication mode.

6. A communication method as claimed in claim 5, further comprising the steps of:

returning said assigned slave device to the usual communication mode by sending an assigned communication cancelling command from said control device to said assigned slave device and measuring a time after said assigned slave device is returned to the usual communication mode; and returning said control device and said remaining slave devices to the usual communication mode at a time when a predetermined time exceeding the maximum rest time period is measured.

7. A communication method as claimed in claim 5, further comprising the steps of:

preliminarily sending a command for invalidating the receiving inhibit command from said control device to said assigned slave device in shifting the usual communication mode to the assigned communication mode; and sending the receiving inhibit command to all of the plurality of said slave devices in a multiple address system after the command for invalidating the receiving inhibit command is sent from said control device to said assigned slave device.

8. A communication method as claimed in claim 5, further comprising the steps of:

sending a response request command from said control device to said remaining slave devices after said control device sends the receiving inhibit command to all of the plurality of said slave devices in the multiple address system; and executing a communication in the assigned communication mode after confirming no response from any of said remaining slave devices.

9. A control device connected to a bus or ring type common transmission channel of a network for controlling a plurality of slave devices connected to said common transmission channel, comprising:

means for executing a communication in the usual communication mode between said control device and all of said slave devices concurrently or only with selectively assigned slave devices; and means for shifting the usual communication mode to an assigned communication mode in which an individual communication is possible only between said control device and said selectively assigned slave devices, by sending a receiving inhibit command to the remaining unassigned slave devices;

means for executing a communication based on an individual communication protocol under a condition that maximum rest time period of data from each of said control device and said selectively assigned slave devices is within a constant time, after the usual communication mode is shifted to the assigned communication mode.

10. A control device as claimed in claim 9, further comprising:

a timer;

means for returning said assigned slave device to the usual communication mode by sending an assigned communication cancelling command to said assigned slave device;

means for actuating said timer after said assigned slave device is returned to the usual communication mode; and means for returning to the usual communication mode at a time when said timer measures a predetermined time exceeding the maximum rest time period.

11. A control device as claimed in claim 9, further comprising:

means for preliminarily sending a command for invalidating the receiving inhibit command to said assigned slave device in shifting the usual communication mode to the assigned communication mode; and means for sending the receiving inhibit command to all of the plurality of said slave devices in a multiple address system after the command for invalidating the receiving inhibit command is sent to said assigned slave device.

12. A control device as claimed in claim 9, further comprising means for sending a response request command to said remaining slave devices after said control device sends the receiving inhibit command to all of the plurality of said slave devices in the multiple address system and executing a communication in the assigned communication mode after confirming no response from any of said remaining slave devices.

13. A slave device connected to a bus or ring type common transmission channel of a network to which a control device is connected comprising:

signal detection means for detecting whether or not data signal exists on said common transmission channel; and a timer adapted to be reset when said signal detection means detects data signal means for executing a communication with said control device in the usual communication mode;

means for executing a communication with said control device in an assigned communication mode when said slave device receives a protocol setting command from said control device;

means for setting said slave device in a receiving inhibit mode to neglect data on said common transmission channel when said slave device receives the receiving inhibit command from said control device; and means for executing a communication in the assigned communication mode under a condition that maximum rest time period of communication data is within a constant time.

14. A slave device as claimed in claim 13, further comprising means for actuating said timer after said slave device receives the receiving inhibit command and means for returning to the usual communication mode at a time when said timer measures a predetermined time exceeding the maximum rest time period.

15. A slave device as claimed in claim 14 further comprising means for preliminarily sending a command for invalidating the receiving inhibit command to said assigned slave devices in shifting the usual communication mode to the assigned communication mode and means for sending the receiving inhibit command to all of the plurality of said slave devices in a multiple address system after the command for invalidating the receiving inhibit command is sent to said assigned slave devices.

* * * * *